Dec. 7, 1954  R. N. CASE  2,696,392
BALL AND SOCKET TYPE TRAILER HITCH
Filed Sept. 18, 1952
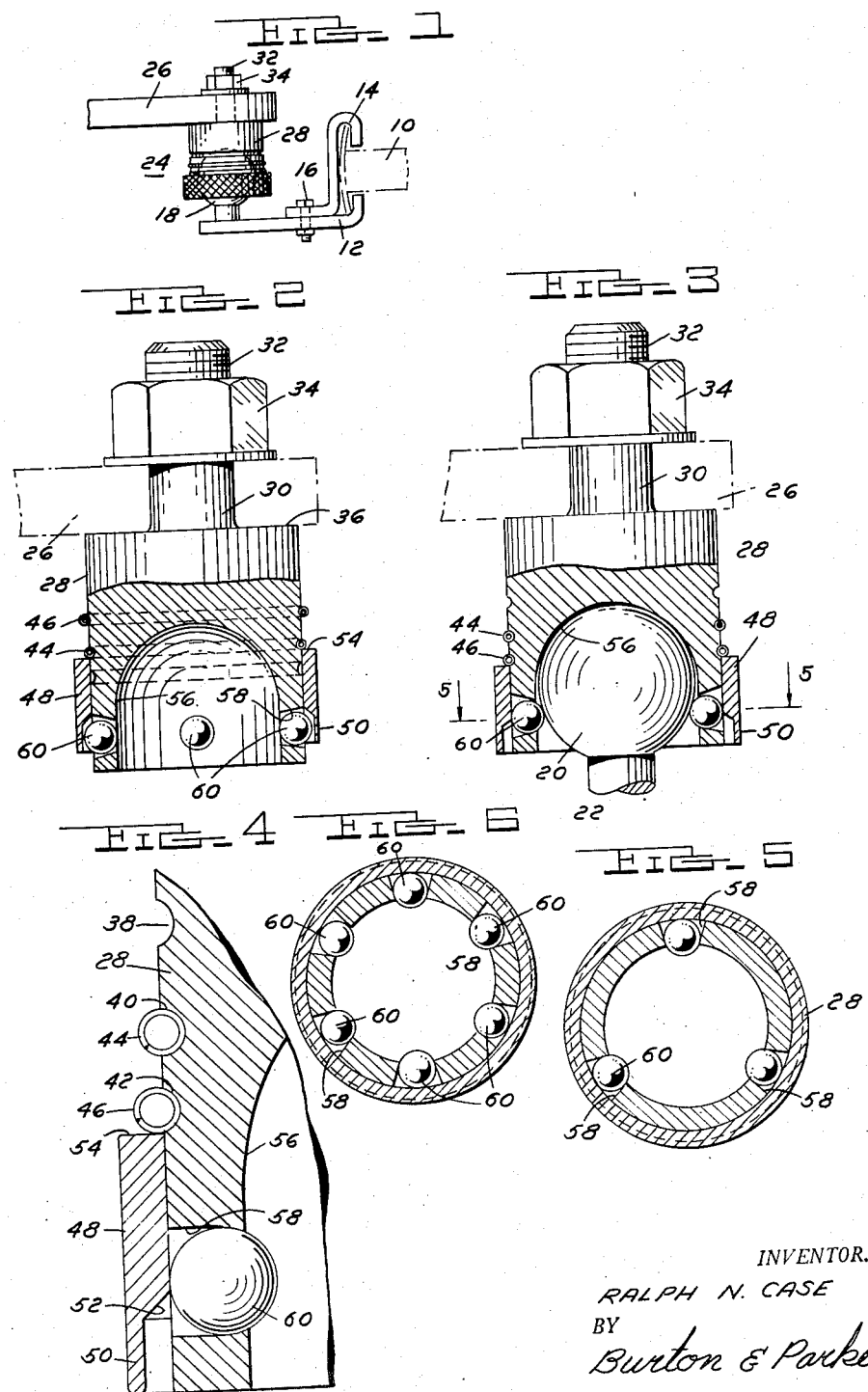
INVENTOR.
RALPH N. CASE
BY
Burton & Parker
ATTORNEYS

United States Patent Office 2,696,392
Patented Dec. 7, 1954

2,696,392

BALL-AND-SOCKET TYPE TRAILER HITCH

Ralph N. Case, Detroit, Mich.

Application September 18, 1952, Serial No. 310,200

6 Claims. (Cl. 280—513)

This invention relates to trailer hitches and particularly to a ball-and-socket type hitch.

An object of this invention is to provide an improved trailer hitch which is of simple and sturdy construction and which meets a high standard of safety.

Another object is to provide a trailer hitch which comprises a socket member mounted on the trailer and adapted to seat over the conventional ball member mounted on the automobile, and provide a coupling which is quiet as the trailer is being towed.

Another object is the provision in a ball-and-socket type trailer hitch of a number of ball bearing surfaces against which the lower half of the ball member rides when the ball and socket are coupled together, thereby providing a more smoothly operating hitch.

Another object is the provision of a trailer hitch having a socket member substantially hemispherically recessed and adapted to receive the conventional ball member mounted upon the automobile and swingably retain the ball member therein by means of one or more cooperating ball bearings urged against the lower hemisphere of the ball member.

A further object of my invention, having one or more ball bearings mounted as hereinabove described, is the provision of a sleeve adapted to slide upon the periphery of the socket member and engage said ball bearings to position the bearings for contact with the lower hemisphere of a ball member seated in the recess.

A meritorious feature of my invention is the provision of a trailer hitch having a cylindrical socket member substantially semi-spherically recessed to receive a ball member therein and provided with one or more ball bearings mounted within the wall surrounding the recess and limitedly movable therethrough, and a sleeve slidably mounted on the periphery of the socket member and adapted to slidably determine the position of the ball or balls within the walls of the recess.

A further meritorious feature of my invention is the provision in a trailer hitch of the character described of a pair of springs peripherially wrapped about the socket member and seated within circumferential seats formed in the outer surface of the socket member and adapted to determine the amount of linear slidable movement of the sleeve along the socket member.

A still further meritorious feature of my invention is the provision of three linearly spaced apart circumferential grooves formed in the outer surface of the socket member, with the intermediate groove being deeper than the adjacent grooves, and two helical coil springs gripping seated within two of these grooves, with one of the springs seated in the intermediate groove, and the other spring displaceable from one of the other grooves to be seated in the third groove.

Other objects and advantages will more fully appear from the following claims, specification and drawings wherein:

Fig. 1 is a schematic illustration of my trailer hitch fastened to an automobile;

Fig. 2 is a partially broken away front elevation of the socket member;

Fig. 3 is the same as Fig. 2 but with the ball retaining sleeve in a different position;

Fig. 4 is a broken sectional view through a wall of the socket member showing the sleeve retaining springs;

Fig. 5 is a cross-sectional view taken on line 5—5 of Fig. 3 showing the relative position of three ball bearings within the walls of the socket member; and Fig. 6 is the same view as Fig. 5 but showing the use of six ball bearings instead of three.

In Figure 1, reference numeral 10 indicates the rear bumper of an automobile to which my invention is to be attached. An L-shaped flange 12, and a somewhat S-shaped flange 14, secured together by a fastener 16, are adapted to grippingly overlie and be supported upon the rear bumper. Flanges 12 and 14, and the fastener 16 comprise a standard type of mounting for trailer hitches and are in no way intended as a limitation upon my invention but serve only as a means for supporting a ball member over which my improved hitch is seated. Remote from the bumper and upstanding from the flange 12 is a standard type ball member 18 found in common use by makers of trailer hitches. The ball member as generally found today comprises a spherical head portion 20 and a supporting neck portion 22. The neck 22 serves to raise the head 20 above the flange 12 so that a socket seated upon the head is allowed limited vertical rotation without striking the flange.

My invention, generally indicated as 24 in Fig. 1, is adapted to be mounted upon the tongue 26 of the trailer and seat upon the head 20 of the ball 18. In the alternative the above relationship may be reversed with the ball 18 mounted upon the tongue 26 and my invention mounted upon the flange 12.

My improved trailer hitch comprises a generally cylindrical body portion 28 surmounted by an upstanding stud 30 threaded as at 32 and provided with a nut 34 in threaded engagement therewith. In Figs. 1, 2, and 3 the stud 30 is shown as passing through the tongue 26 of the trailer with the upper face 36 of the body abutting the lower side of the tongue and the nut 34 in opposition thereto serving to grippingly retain the hitch upon the tongue. While a stud and nut arrangement is depicted other means such as welding may be employed to fasten the hitch to the tongue.

Three spaced apart circumferential grooves 38, 40 and 42 are provided in the outer wall of the body 28. Two endless helical coil springs 44 and 46 are adapted to seat in these grooves. For a reason hereinafter explained, grooves 38 and 42 are of substantially equal depth while the intermediate groove 40 is cut somewhat deeper as shown in Fig. 4.

Slidably mounted upon the body 28 is the sleeve 48, provided about its lower periphery with a flange portion 50, chamfered as at 52 as shown in Figs. 2, 3 and 4. The upper face 54 of the sleeve is adapted to abut the springs 44 and 46.

A concave recess 56, somewhat in the shape of the inner face of a hemisphere is provided within the body 28. This recess permits the body to seat upon the head 20 of the ball member 18. Uniformly spaced around the body 28 and passing through the walls of the recess 56 are annular passages 58 having converging side walls. Ball bearings 60 are adapted to seat within these passages with sufficient tolerance between the size of the passages and the balls to permit a portion of the latter to extend into the recess 56 as shown particularly in Figs. 3, 4, 5 and 6. As shown in Fig. 3, the bearings are adapted to extend into the recess 56 a distance sufficient to engage the head 20 of the ball 18 and swingably retain it in the recess.

Fig. 2 shows the ball bearings in the retracted position with the sleeve 48 raised so that edge 54 of the sleeve bears against spring 44. With the ball bearings in this position the hitch may be seated upon the head of the ball 18. The sleeve is then lowered, and with such movement the chamfer 52 of the flange 50 rides over the ball bearings forcing them farther into the passages 58 and thence a portion of them into the recess 56. The bearings are held in this position by the sleeve 48 and by the beveled walls of the passages as is shown in Fig. 3.

The spring 46, heretofore seated in groove 38 is manually unseated and drawn down over spring 44 and reseated in groove 42. With the spring in this groove, the sleeve cannot be raised by any jarring or jolting of the hitch. If it is desired to uncouple the hitch the sleeve is forcibly raised against the resistance of the spring 46 which when enough lifting force is applied "jumps" up the body 28, over the spring 44 and into the groove 38. The sleeve may then be raised until it abuts the spring 44. Upon raising the sleeve the ball bearings will be permitted to retract by virtue of the spacing of flange 50 from the body 28.

The sleeve cannot be raised against the resistance of spring 44 because, as before stated, the groove 40 in which the spring is seated is deeper than grooves 38 or 42. Grooves 38 and 42 are shallow so that spring 44 can be unseated without substantial effort.

Fig. 6 depicts a form of my hitch wherein six ball bearings are used instead of three. This is desirable where the trailer to be drawn is quite heavy. However, any number of ball bearings could be used that would produce a satisfactory result under given conditions, without departing from the spirit of my invention.

While endless helical coil springs are shown seated within the grooves 38, 40 and 42, it should be understood that in the alternative spring rings or split rings might be employed.

What I claim is:

1. In a ball-and-socket type trailer hitch having the ball member mounted on one vehicle and the hitch mounted on the other vehicle, a cylindrical body member exhibiting a downwardly opening ball receiving recess adapted to seat over the ball, a plurality of ball bearings slidably disposed within said body spaced around the periphery of the recess and adjacent the opening thereof and shiftable to project interiorly of the body, a sleeve slidably mounted on said body and movable linearly thereof to one position to abut and urge the bearings inwardly toward a ball member seated in the recess and to another position to permit the bearings to retract away from said ball member, said body provided with a plurality of encircling grooves formed in its outer surface, a spring ring tensioned to seat in one of these grooves to abut and limit the slidable movement of said sleeve and yieldable to permit displacement to another groove to permit slidable movement of the sleeve.

2. In a ball-and-socket type trailer hitch having the ball member mounted on one vehicle and the hitch mounted on the other vehicle, a cylindrical body member exhibiting a downwardly opening ball receiving recess adapted to seat over said ball member, a plurality of ball bearings rotatably and slidably mounted within the wall of said recess adjacent the opening thereof and shiftable inwardly and outwardly with respect to the recess, a locking sleeve mounted on the periphery of the body and slidable linearly thereover and operable in one position to abut said bearings and urge them into the recess and in another position to permit the balls to move outwardly of the recess, said body having at least two encircling peripheral grooves spaced apart lengthwise of the body superjacent the sleeve, two helical spring rings tensionally seated in the grooves, one of said rings tensioned to cooperatively react to lineal movement and abutment by the sleeve to advance to another of said grooves to be seated therein.

3. In a ball hitch coupling having a part provided with a ball, a body having a ball receiving recess and provided with an opening through the wall surrounding the recess, a ball bearing mounted within the opening and movable into and out of the recess, a sleeve encircling that portion of the body provided with the opening and shiftable to two positions over the opening, said sleeve so shaped interiorly that in one position it holds the ball bearing inwardly of the opening and within the recess and in the other position it holds the ball bearing within the opening but permits it to move outwardly out of the recess, a spring ring grippingly encircling the body above the sleeve and adapted to abut the sleeve to determine one position thereof, said ring shiftable over the body to permit movement of the sleeve to its second position.

4. A ball hitch coupling as defined in claim numbered 3 characterized in that the body is provided with two spring rings tensioned thereabout and two spring rings seats one for each ring, each ring adapted when disposed upon its seat to project outwardly of the body and abut the sleeve when the sleeve is moved thereagainst to determine one position of the sleeve upon the body one of said spring rings being resistingly expansible under pressure of the sleeve and operable to be displaced from its seat to permit movement of the sleeve over the seat to its second position.

5. In a ball hitch coupling having a part provided with a ball, a cylindrical body having a ball receiving recess and provided with an opening through the wall surrounding the recess, a ball bearing mounted within the opening and movable into and out of the recess, a cylindrical sleeve encircling that portion of the body provided with the opening and shiftable to two positions over the opening, said sleeve so shaped interiorly that in one position it holds the ball bearing inwardly of the opening and within the recess and in the other position it holds the ball bearing within the opening but permits it to move outwardly of the recess, said body shaped to provide an upper and a lower encircling ring seat, two helical spring rings tensioned thereabout with one of the rings adapted to be seated in either the upper or the lower ring seats, said body provided with a third ring seat disposed between the other two and adapted to receive the other of the said two rings, the spring rings adapted to project outwardly beyond the body when disposed on their seats, the first mentioned spring ring when seated on the lower ring seat adapted to abut the sleeve to determine one position thereof but yieldingly expansible under pressure of the sleeve to be displaced out of the lower seat and over the second mentioned ring into the upper seat, said second mentioned ring adapted when seated in the intermediate seat to abut the sleeve when the sleeve is moved upwardly thereagainst to determine the second position of the sleeve.

6. A ball and socket coupling having a cooperating ball member comprising, in combination, a cylindrical body member recessed to receive the ball member, ball retaining means adjacent the recess opening operable to engage the ball member seated in said recess, actuating means slidably mounted on said body and adapted when slidably moved to one position to cooperate with the ball retaining means to hold the latter in engagement with the ball and adapted when slidably moved to another position to release the ball, said body member peripherally recessed to provide a plurality of spring ring seating grooves, a pair of spring rings seated in two of these grooves with one of the rings displaceable to another of the grooves to abut and yieldingly hold the actuating means in its first mentioned position, said one spring being displaceable to another groove when the actuating means is urged toward its second mentioned position and into engagement with the other of the spring rings.

References Cited in the file of this patent

UNITED STATES PATENTS

| Number | Name | Date |
|---|---|---|
| 1,636,421 | Knott | July 19, 1927 |
| 1,927,591 | Jacob | Sept. 19, 1933 |
| 2,198,159 | Foley | Apr. 23, 1940 |
| 2,458,209 | Sawatzki | Jan. 4, 1949 |

FOREIGN PATENTS

| Number | Country | Date |
|---|---|---|
| 644,171 | Great Britain | Oct. 4, 1950 |